No. 762,089. Patented June 7, 1904.

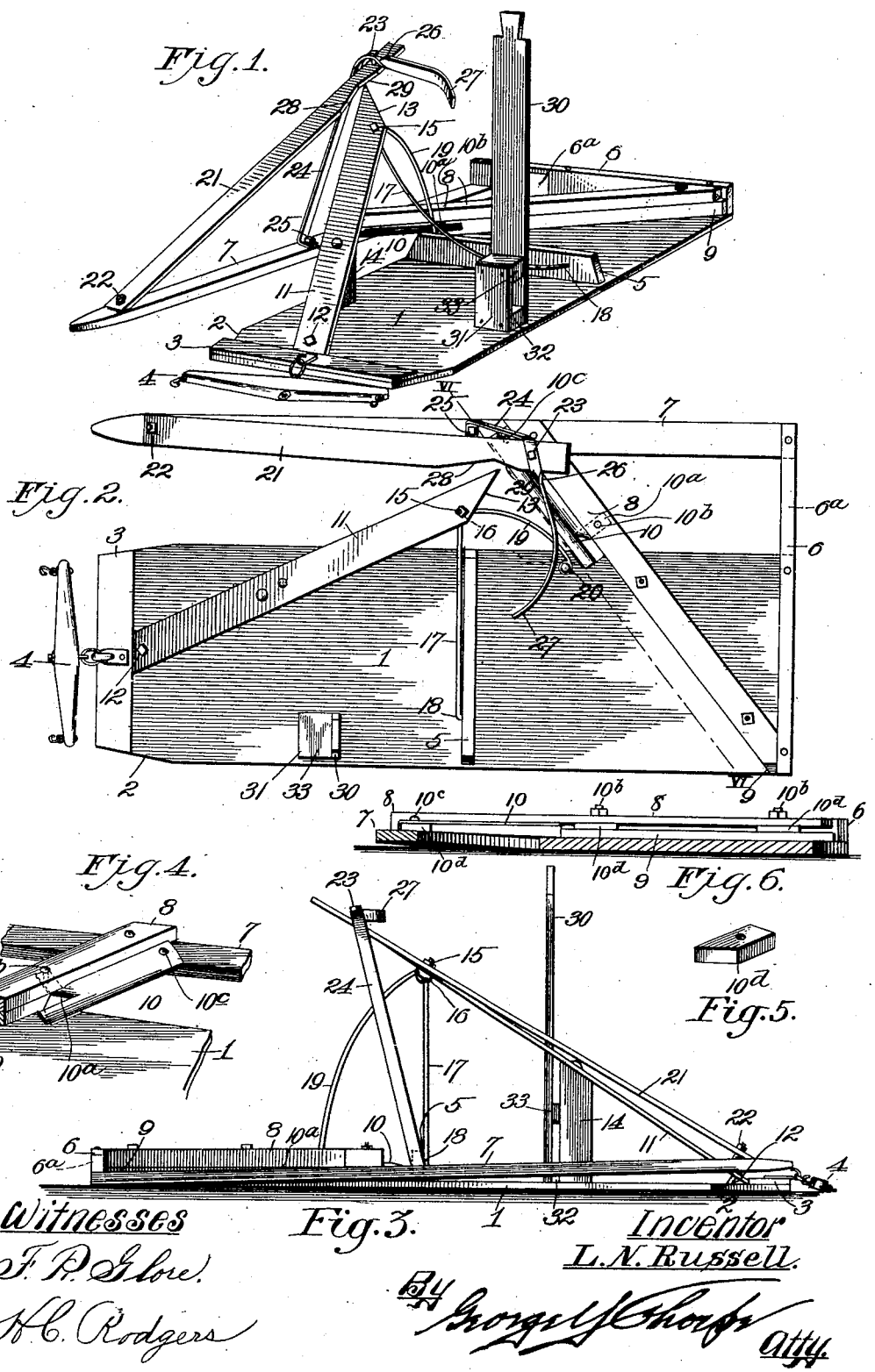

UNITED STATES PATENT OFFICE.

LEWIS N. RUSSELL, OF RHEA, OKLAHOMA TERRITORY.

CORN-HARVESTER.

SPECIFICATION forming part of Letters Patent No. 762,089, dated June 7, 1904.

Application filed January 14, 1904. Serial No. 189,007. (No model.)

*To all whom it may concern:*

Be it known that I, LEWIS N. RUSSELL, a citizen of the United States, residing at Rhea, in the county of Dewey and Territory of Oklahoma, have invented certain new and useful Improvements in Corn-Harvesters, of which the following is a specification.

My invention relates to corn-harvesters; and my object is to produce a simple, strong, durable, and efficient harvester by which a single operator—viz., the driver—can cut sufficient corn to be assembled into about one hundred shocks of two hundred and fifty hills to the shock per day.

A further object is to produce a harvester which can be easily and cheaply repaired, which is of light draft, and which is unprovided with wheels or runners, and therefore keeps the row more reliably than a machine equipped with wheels or runners.

With these general objects in view the invention consists in certain novel and peculiar features of construction and combinations of parts, as hereinafter described and claimed, and in order that it may be fully understood reference is to be had to the accompanying drawings, in which—

Figure 1 represents a perspective view of a corn-harvester embodying my invention. Fig. 2 is a top plan view of the same. Fig. 3 is a side elevation of the same. Fig. 4 is a detail perspective view of a part of the machine to show clearly the construction and arrangement of the knife. Fig. 5 is a detail perspective view of one of the blocks employed to elevate the knife in position to cut the stalks in a higher plane. Fig. 6 is a section taken on the line VI VI of Fig. 2, but showing only the lower portion of the machine and showing therein the blocks for elevating the knife for cutting the corn with a longer stub.

Referring to the drawings in detail, 1 designates a drag-platform of suitable proportion and adapted to travel or slide directly on the ground, the front end of the platform being preferably tapered, as at 2, and reinforced, as by cross-bar 3, a swingletree 4 being coupled to the center of the cross-bar in the usual manner. Approximately midway the length of the platform is a cross-bar 5, and at its rear end is a cross-bar 6, which projects laterally beyond one side of the platform and is attached to a bar 7, approximately parallel with and the same length as platform 1, the space between platform 1 and bar 7 forming a longitudinal slot open at its front end. Bars 1, 6, and 7 constitute, in effect, a slotted platform, bar 7 thereof being pitched upwardly at a slight angle toward its tapered front end, so as to avoid digging into the ground and imposing unnecessary and undesirable resistance to the progress of the machine, the tapered end acting to push aside clods more reliably than would be the case if the front end of bar 7 were square.

8 designates a bar bridging the slot diagonally so as to converge rearwardly and with respect to the platform-body 1 and bolted or otherwise secured to said portion and the interposed bar 9, which extends across platform portion 1 only, as shown in Fig. 1.

10 is a knife fitting against the front edge of bar 8 and having its inner end split to form an arm $10^a$, which is bent back under and is bolted to bar 8, as at $10^b$, the opposite end of the knife being bolted down upon the bar 7, as at $10^c$. By this construction and arrangement the knife can be easily and quickly removed for sharpening purposes.

In Fig. 6 I show a cross-section of the machine as equipped with the blocks for raising the knife to cut the corn with longer stubs than would be left with a machine as constructed in Figs. 1 to 4, inclusive. Certain of these blocks $10^d$ are perforated and fitted between the bars 8 and 9, the bolts connecting said bars passing through said blocks. A similar block is interposed between bar 7 and the knife, bolt $10^c$, which secures the knife to bar 7, also passing through said block. To accommodate the corn-stubs so that the machine shall pass freely over them, bar 6 is notched, as at $6^a$, at its under side, said notch being sufficiently deep to permit tall or short stubs to pass through.

11 designates a guide-bar which is pitched upwardly at a suitable angle and is secured at its lower end, as at 12, to platform portion 1 near its front end and center. Bar 11 converges rearwardly with respect to bar 7 and terminates with its upper end about vertically over the center of the platform-slot, as shown clearly in Fig. 2, being beveled at its rear end, so that said end shall slope forwardly toward platform-body 1, as at 13, the bar being braced in the position described and shown by means of brace 14 upon portion 1 and at its rear end by a guide-frame.

15 is a bolt secured to bar 11 near the junction of its inner and rear edges, and 16 is a coil or eye formed at the rear end of said guide-frame and secured upon said bolt 15 below the bar. One arm, 17, of said frame curves downwardly from said loop and laterally over platform-body 1 and is secured, as at 18 or otherwise, to cross-bar 5, the other arm, 19, curving downward, rearward, and laterally to said platform-body, where it is securely bolted, as at 20, contiguous to the rear edge of the knife.

21 designates a guide-bar, companion to bar 11 and pitched at about the same angle from a vertical plane, and said bar is bolted, as at 22, at its front end to the front end of bar 7 and near its rear end, as at 23, to the upper end of a brace 24, secured at its lower end, as at 25, to the bar 7 opposite the contiguous end of cross-bar 5. Said brace at its point of connection with bar 21, which slopes laterally toward bar 11, is twisted, as at 26, and terminates in an arm 27, which bridges the slot and curves forwardly at its front end, as shown clearly. Contiguous to the upper end of guide-bar 11 the inner edge of bar 21 is notched, so as to provide a wall 28, which approximately parallels bar 11, so as to carry the corn, as hereinafter explained, past the point of the last-named arm, and a wall 29, which extends rearward of the point of bar 11 and inwardly, so as to carry the corn back of the point of said bar 11, as also hereinafter explained.

Upon platform-body 1, near its edge most remote from the slot and forward of bar 5, is a standard 30, against which the corn is adapted to be stacked, as hereinafter explained, a short parallel bar 31 being connected at its lower end to standard 30 by the cross-piece 32 and at its upper end to said standard by a cross-piece 33, so as to brace the standard.

In the practical operation of the machine as it is drawn forward with the slot in line with the corn-row the corn successively enters the platform-slot and is slightly deflected laterally by bar 11 until it passes through the narrow space between said bar and wall 28, hereinbefore referred to, and as it emerges from said narrow passage is deflected in the opposite direction by wall 29 so as to lie wholly behind the point of bar 11. After such passage it is engaged by the knife and by arm 27 of the brace, the obliquity of the knife tending to crowd the corn laterally toward the platform portion 1 and by a draw cut sever the stalk. As it is severed arm 27 tends to throw it forward and against the forwardly-beveled end 13 of bar 11, which in turn deflects it toward the platform portion 1. As a consequence it falls under the pressure of arm 27 forwardly and inwardly over the guide and brace frame, the arm 19 of which compels it bodily to move to the left in the early part of the falling movement, while arm 17 in the latter part of the movement causes it to slide or roll toward the opposite side of the platform and against standard 30 or the corn that has previously been deposited upon the platform, the corn automatically assuming approximately a longitudinal position and resting at its front end upon the forward part of platform 1 and at its rear end upon cross-bar 5, and therefore out of the way of the driver, who stands upon the platform rearward of said cross-bar and guide-frame arm 27. When sufficient corn has accumulated, the driver twists his lines about standard 30, picks the corn up from the platform, and deposits it at the side of the machine at the point where a shock is to be erected, after which he proceeds on his way. All subsequent operations are repetitions of those described.

From the above description it will be apparent that I have produced a corn-harvester which embodies the features of advantage enumerated as desirable in the statement of invention and which, by reason of the fact that it is in the form of a drag, more reliably maintains its position in the row than if equipped with wheels or runners. It can also be used on Kafir corn and would run obviously upon the sod when the ground is so rough that it would be impossible to use runners or wheels. Furthermore, by bridging and riding over clods the draft is much lighter than in a machine provided with wheels or runners.

The harvester is obviously susceptible of modification in minor particulars without departing from its principle and scope or sacrificing any of its advantages.

Having thus described the invention, what I claim as new, and desire to secure by Letters Patent, is—

1. A corn-harvester, comprising a drag-platform having a longitudinal slot open at its front end, an obliquely-extending knife bridging said slot, guide-bars secured to the platform and projecting upward and rearward from opposite sides of the slot, a guide-frame secured to the platform at its lower end at one side of the slot and at its upper end to the guide-bar at the same side of the slot as the lower end, said guide-frame comprising a downwardly and laterally extending front arm concaved upwardly, and a rear arm which curves downwardly, inwardly, and rearwardly, and an arm secured to the upper end of the other guide-bar at a point rearward of the guide-bar to which said frame is attached; said guide-arm extending laterally and rearwardly over the slot and then curving forwardly to deflect the corn against the rear arm of said frame, and then down upon its front or laterally-extending arm.

2. A corn-harvester, comprising a drag-platform, having a longitudinal slot open at its front end, an obliquely-extending knife bridging said slot, guide-bars secured to the platform and projecting upward and rearward from opposite sides of the slot, a guide-frame secured to the platform at its lower end at one side of the slot and at its upper end to the guide-bar at the same side of the slot as the lower end, said guide-frame comprising a downwardly and laterally extending front arm concaved upwardly, and a rear arm which curves, downwardly, inwardly, and rearwardly, an arm secured to the upper end of the other guide-bar at a point rearward of the guide-bar to which said frame is attached; said guide-arm extending laterally and rearwardly over the slot and then curving forwardly to deflect the corn against the rear arm of said frame, and then down upon its front or laterally-extending arm, and a standard upon the platform forward of said laterally-extending arm, and near the side of the platform most remote from the slot.

3. A corn-harvester, comprising a drag-platform, having a longitudinal slot open at its front end, the portion of the platform at the right-hand side of said slot being pitched upwardly and forwardly at a slight angle, an obliquely-extending knife bridging said slot, guide-bars secured to the platform, and projecting upward and rearward from opposite sides of the slot, a guide-frame secured to the platform at its lower end at one side of the slot and at its upper end to the guide-bar at the same side of the slot as the lower end, said guide-frame comprising a downward and laterally extending front arm concaved upwardly, and a rear arm which curves downwardly, inwardly, and rearwardly, and an arm secured to the upper end of the other guide-bar at a point rearward of the guide-bar to which said frame is attached; said guide-arm extending laterally and rearwardly over the slot and then curving forwardly to deflect the corn against the rear arm of said frame, and then down upon its front or laterally-extending arm.

4. A corn-harvester, comprising a drag-platform, having a longitudinal slot open at its front end, an obliquely-extending knife bridging said slot, bars secured at their front ends to the platform at opposite sides of the slot, and suitably braced from opposite sides of said slot, and extending upwardly and rearwardly and converging so that their upper ends shall occupy the vertical plane of the slot, the bar at one side of the slot being shorter than the other and having its rear edge tapered as at 13, the other bar opposite the point of the tapered bar having its inner edge notched to provide walls 28 and 29, an arm projecting from the last-named bar at a point rearward of wall 29 across said slot and terminating in a forwardly-curved end over that portion of the platform to the left of the slot, a guide-frame, comprising arms 17 and 19, secured to the left-hand portion of the platform at their lower ends and at their upper ends to the guide-bar having the tapered end, and a standard erected near the left-hand margin of the portion of the platform to the left of the slot, and forward of said guide-frame.

In testimony whereof I affix my signature in the presence of two witnesses.

LEWIS N. RUSSELL.

Witnesses:
 F. R. MURPHY,
 J. PAUL JONES.